T. B. McConaughey's Governor.

PATENTED JAN 7 1868

No. 73,111

Witnesses: Jno. A. Ellis, Jas. White

Inventor: Thos. B. McConaughey, Per T. H. Alexander, Atty.

United States Patent Office.

THOMAS B. McCONAUGHEY, OF NEWARK, DELAWARE.

*Letters Patent No. 73,111, dated January 7, 1868.*

IMPROVEMENT IN GOVERNORS.

The Schedule referred to in these Letters Patent and making part of the same.

TO ALL WHOM IT MAY CONCERN:

Be it known that I, THOMAS B. McCONAUGHEY, of Newark, in the county of New Castle, and State of Delaware, have invented certain new and useful Improvements in Governors; and I do hereby declare that the following is a full, clear, and exact description thereof, reference being had to the accompanying drawings, and to the letters of reference marked thereon, which form a part of this specification. In the annexed drawings, which make a part of this specification—

Figure 1:
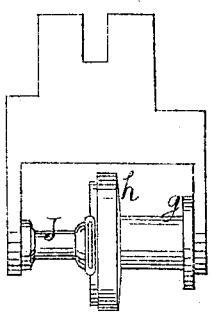
Figure 1 is a plan view of the hinged arm and driving-pulley of my governor.
Figure 2:
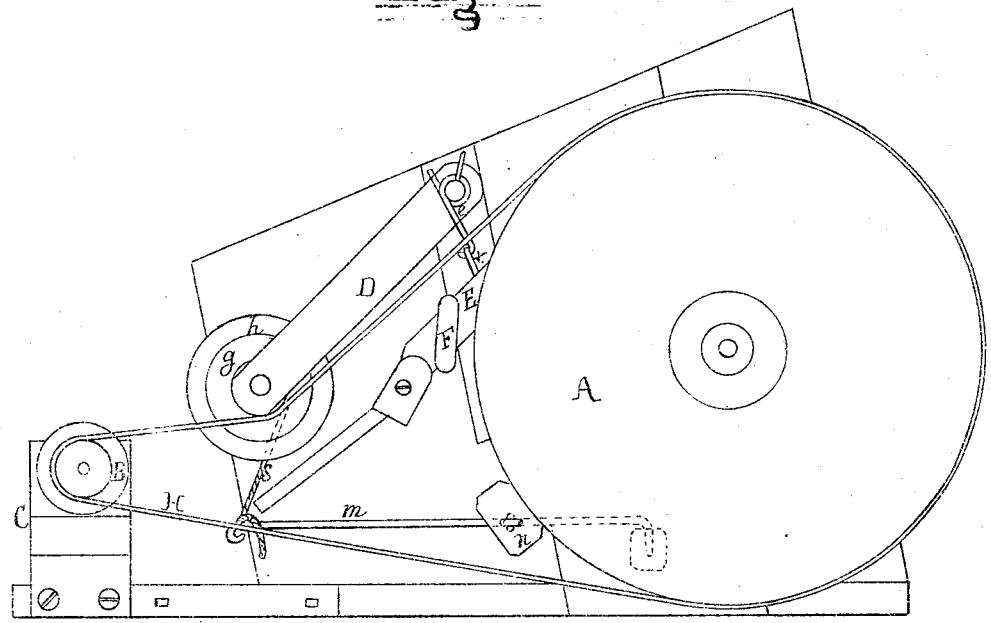
Figure 2 represents a side elevation of the several devices which form my machine.
Figure 3:
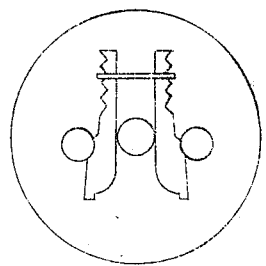
Figure 3 is a plan view of the governor-pulley.

A represents the main wheel, which may be put in motion by horse or other power. B designates a pulley, placed in line with wheel A and fastened to the stanchion C. D represents an arm or lever, forked at both ends, as shown in fig. 1. The upper end of arm D plays on a pivot, which is fastened to the frame of my machine. Attached to the said pivot is the rod $e$, with a hook at its lower end, the use of which will be hereinafter explained. The lower end of arm D is furnished with driving-pulley $g$ and governor-pulley $h$, and also with the loose pulley $j$, (see fig. 1.) $m$ represents the rod, to which the brake $n$ is attached. The outer end of said rod is connected by a cord, $s$, with pulley $j$, and the inner end is fastened to the frame, as seen in red dotted lines in fig. 2. E represents a tripping-lever, to the outer side of which is fastened the brake F. The inner end of lever E is secured to the frame of my machine. On the upper side of lever E is a staple, $t$, which is intended to receive the hook on rod $e$ when it is desired to relieve the wheel A from the pressure of brake F.

In order to start my machine, it will be necessary, in the first place, to raise the lever E, so as to relieve the wheel from the brake F, as above described. The power will then be under the control of the governor, acting on brake $n$ by means of rod $m$ and cord $s$. Should the belt H, which drives the governor-shaft, happen to break or come off the wheel A, the arm D will be left without support at its lower end; and the upper end being pivoted in the manner heretofore described, will, by the downward motion of the lower end of D, disengage the tripping-lever E from the hook $e$, so that the brake F will come in contact with the circumference of the wheel A, and immediately arrest its motion.

Having thus described my machine, what I claim, and desire to secure by Letters Patent, is—

1. The hinged arm D, in combination with hook $e$ and tripping-lever E, when constructed and operating substantially as set forth.

2. The governor-pulley $h$, when driven by and combined with pulley $g$ and belt H, in the manner substantially as specified.

In testimony that I claim the foregoing as my own, I affix my signature in presence of two witnesses.

THOS. B. McCONAUGHEY.

Witnesses:
 E. B. McCONAUHEY,
 CHESTER WELLS.